United States Patent [19]
Amoni et al.

[11] Patent Number: 5,884,086
[45] Date of Patent: Mar. 16, 1999

[54] SYSTEM AND METHOD FOR VOLTAGE SWITCHING TO SUPPLY VARIOUS VOLTAGES AND POWER LEVELS TO A PERIPHERAL DEVICE

[75] Inventors: Sergio Amoni, Raleigh; Paul Daniel Kangas, Cary; John David Landers, Jr., Raleigh, all of N.C.

[73] Assignee: International Business Machines Corporation, Armonk, N.Y.

[21] Appl. No.: 842,695

[22] Filed: Apr. 15, 1997

[51] Int. Cl.[6] .................................................. G06F 1/26
[52] U.S. Cl. ................ 395/750.01; 395/750.02; 364/492
[58] Field of Search .......... 395/750.01, 750.03, 395/750.07, 750.06; 364/707, 492

[56] References Cited

U.S. PATENT DOCUMENTS

| | | | |
|---|---|---|---|
| 4,782,355 | 11/1988 | Sakai et al. | 396/72 |
| 4,884,287 | 11/1989 | Jones et al. | 375/377 |
| 4,901,217 | 2/1990 | Wilson | 363/126 |
| 5,121,500 | 6/1992 | Arlington et al. | 395/750.07 |
| 5,179,710 | 1/1993 | Coschieri | 395/750.01 |
| 5,313,642 | 5/1994 | Seigel | 395/750.05 |
| 5,408,669 | 4/1995 | Stewart et al. | 395/750.01 |
| 5,483,656 | 1/1996 | Oprescu et al. | 395/750.03 |
| 5,493,684 | 2/1996 | Gephardt et al. | 395/750.04 |
| 5,514,859 | 5/1996 | Seigel | 235/462 |
| 5,560,022 | 9/1996 | Dunstan et al. | 395/750.01 |
| 5,652,895 | 7/1997 | Poisner | 395/750.04 |
| 5,742,514 | 4/1998 | Bonola | 379/258 |

OTHER PUBLICATIONS

Halfhill, T. R., "The New PC," *BYTE*, Oct. 1995, pp. 52–64.
Klein, R. H., "Bus Pass for Serial Killers," *New Electronics*, 9 Jan. 1996, pp. 18–19.
*Universal Serial Bus Specification*, 1.0 Final Draft Revision, Nov. 13, 1995, Copyright ©1995, Compaq Computer Corporation, et al.
Wright, M., Ed., "USB and IEEE 1394: Pretenders, Contenders, or Locks for Ubiquitous Desktop Deployment?" *EDN*, Apr. 25, 1996, pp. 79–91.

*Primary Examiner*—Gopal C. Ray
*Attorney, Agent, or Firm*—John D. Flynn; Winstead, Sechrest & Minick, PC

[57] ABSTRACT

Within a data processing system, such as a personal computer, non-standard, or auxiliary, voltage and current may be supplied to an attached peripheral device along with standard Universal Standard Bus (USB) power and signalling. A communication protocol is enabled between the host system and the peripheral device to permit the peripheral device to communicate its power requirements to the host device so that the host device can switch the proper voltage and current through the USB cable to the peripheral device. This allows the peripheral device to obtain power without having to connect to an AC power supply.

21 Claims, 9 Drawing Sheets

| SYNC PATTERN | PID | ADDRESS | ENP | CRC5 | PID | SETUP DATA | CRC 16 | PID |
|---|---|---|---|---|---|---|---|---|
| | TOKEN PACKET WITH PID TYPE = SETUP | | | | DATA PACKET | | | HANDSHAKE PACKET WITH PID = ACK |

FIG. 5

SYSTEM AND METHOD FOR VOLTAGE SWITCHING TO SUPPLY VARIOUS VOLTAGES AND POWER LEVELS TO A PERIPHERAL DEVICE

CROSS-REFERENCE TO RELATED APPLICATIONS

This application for patent is related to co-pending U.S. patent application Ser. No. 08/807,493, filed Feb. 27, 1997, entitled "ENHANCED UNIVERSAL SERIAL BUS," which is hereby incorporated by reference herein.

TECHNICAL FIELD

The present invention relates to supplying various voltages and power levels via a standard bus interface. More particularly, it relates to supplying multiple voltages via a Universal Serial Bus compatible interface.

BACKGROUND INFORMATION

Recently, personal computers ("PCs") used a variety of techniques for providing input and output. These included a serial port, usually an RS232, a parallel port and several ISA expansion slots included on the mother board. Connecting the PCs to anything more complicated than a mouse, modem or printer required the lid to be taken off and dip switches to be set and software configured. SCSI (small computer systems interface) permitted access to external storage devices, but required a large cable connector with the need to manually set ID numbers and have a terminator.

The universal serial bus ("USB") is specified to be an industry standard extension to the PC architecture with a focus on computer telephony interface, consumer and productivity applications. The USB architecture provides for ease of use of peripheral expansion, transfer rates up to 12 megabits per second, protocol flexibility for mixed modes, isochronous data transfers, and asynchronous messaging. USB is a cable bus supporting data transfer between the host PC and a range of simultaneously testable peripherals. One host controller can support up to 127 physical devices using a tiered topology. The hub is at the center of each star with each wire segment creating a point-to-point connection of up to 5 meters. The 5 meter limitation may be between a host and a hub or a hub function or a hub connected to another hub or function.

Alternatively, a number of peripherals can be daisy chained together through compound hubs via the 4-wire USB cable. One of the 4 wires referred to as VBUS provides a DC voltage of +5 volts and another wire provides a ground signal. The USB cable provides power to the devices along the chain. Signaling takes place over two wires between two end points. The signals of each end point are driven differentially over a 90 ohm impedance with each receiver featuring input sensitivity of at least 200 millivolts. A non-return to zero invert (NRZI) with bit stuffing to insure adequate transitions is used to carry the bus clock down the chain. A sync field precedes each data package to allow the receivers to synchronize their bit recovery clocks. The serial interface provides a bandwidth of 12 megabits per second and can connect as many as 127 devices to a host system.

USB relies on a tiered star topology. Physically USB devices ranging from a mouse or joystick to telephones connect to a host via layers of multiport hubs. The requisite hub called "the root hub" is located in the host and can include multiple ports. Hubs are linked to USB devices via point-to-point connections. The host views all USB devices as if they connect in a true star arrangement. USB supports both the standard devices that operate a full 12 megabit rate and low end devices that use only a 1.5 megabit sub-channel. Hubs support 12 megabit operations and insure that 12 megabit transmissions do not go to 1.5 megabit devices.

USB cables that carry 12 megabit traffic require a shielded twisted pair construction on the signal pair and can be no longer than 5 meters. Low speed cables can be no longer than 3 meters and require no shielding or twisting of the signaling pair. The host uses a master slave protocol to control the bidirectional communications with USB devices. The interface employs a 1 KHZ bus clock that instigates bussing a new frame every 1 millisecond. The interface handles multiple transactions including time critical isochronous transactions within each frame in 1 millisecond periods and 12 megabit per second bandwidth limits the type of isochronous data streams that the interface can successfully carry.

One problem with the universal serial bus is that it provides only one voltage. Devices that operate at different voltages or have high power requirements are required to supply their own voltage sources and power sources. In some environments, for instance, the retail point-of-sale environment, this additional cabling for power creates a non-aesthetic appearance at the store front.

These unresolved problems and deficiencies are clearly felt in the art and are solved by the invention in the manner described below.

SUMMARY OF THE INVENTION

The foregoing need is addressed by the present invention which provides for the communication of auxiliary (non-standard USB) voltage and current to downstream hub and peripheral devices in accordance with the needs of the downstream hub and/or peripheral devices. This is performed over an enhanced USB connection, whereby standard USB signalling is provided along with the auxiliary power.

Communication of auxiliary power requirements is provided from the peripheral device to the upstream hub or host, which then utilizes one or more switches to connect the auxiliary power to the port coupled to the downstream hub/peripheral device.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a communication protocol for communicating auxiliary power requirements to the host from a peripheral device;

DETAILED DESCRIPTION

Figure 1:
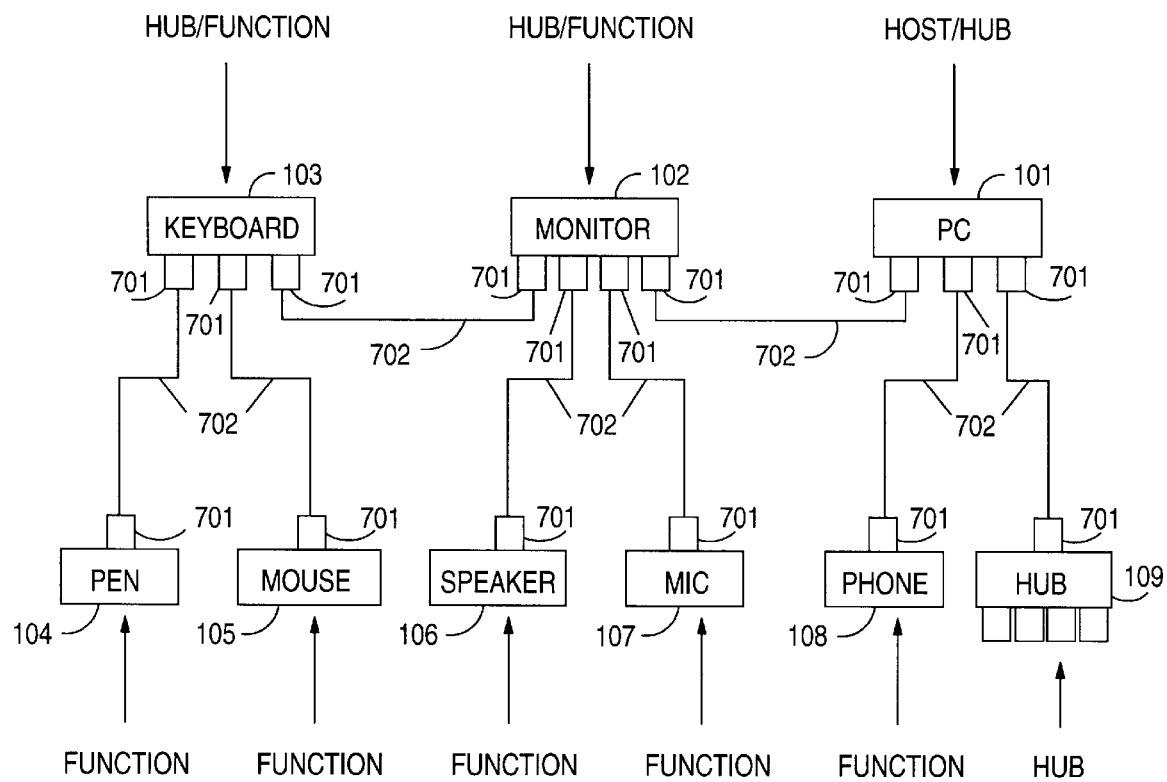
FIG. 1 illustrates a data processing system configured in accordance with the present invention.

In the following description, numerous specific details are set forth such as specific voltages and currents to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Within the following description, a standard universal serial bus connector, receptacle, plug, and signalling all refer to the USB architecture described within the "*Universal Serial Bus Specification*," 1.0 Final Draft Revision, Copyright Nov. 13, 1995, which is hereby incorporated by reference herein. While an embodiment of the invention will be illustrated using the Universal Serial Bus, it is not limited to the USB.

Referring to FIG. 1, there is illustrated a diagram of how hubs provide connectivity in a desktop computer environment. The data processing system shown in FIG. 1 includes computer (PC) 101, monitor 102, and keyboard 103. Coupled to PC 101 are phone 108 and another hub 109. Coupled to monitor 102 are speaker 106 and microphone (MIC) 107. Coupled to keyboard 103 are pen 104 and mouse 105. PC 101 is coupled to monitor 102, which is coupled to keyboard 103. Coupling is via USB buses 702 with USB plug connectors 701 (see FIG. 7).

A function is a USB device that is able to transmit or receive data or control information over the bus. A function is typically implemented as a separate peripheral device with a cable that plugs into a port on a hub. However, a physical package may implement multiple functions and an embedded hub with a single USB cable. This is known as a compound device. A compound device appears to the host as a hub with one or more permanently attached USB devices.

Each function contains configuration information that describes its capabilities and resource requirements. Before a function can be used, it must be configured by the host. This configuration includes allocating USB bandwidth and selecting function specific configuration options.

Figure 7:
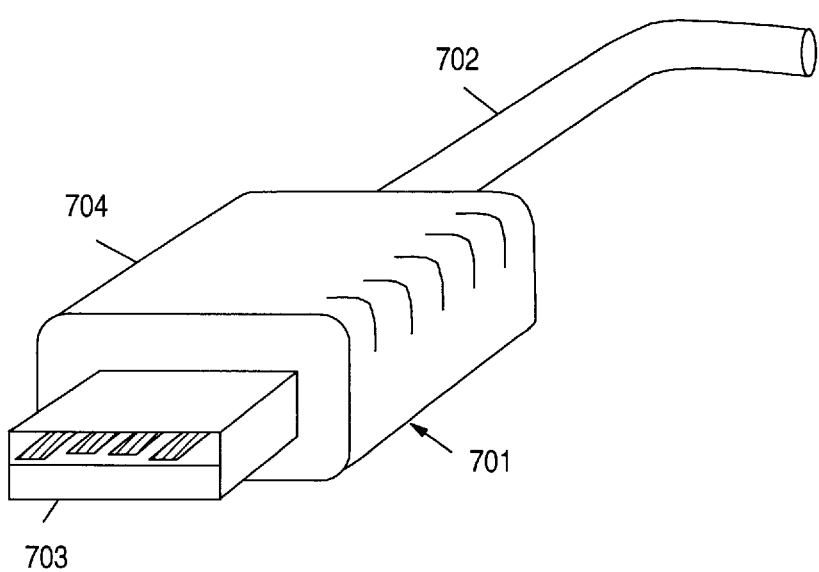
FIG. 7 illustrates a standard USB plug.

Referring next to FIG. 7, there is illustrated standard USB cable plug 701 having bus 702 coupled thereto. Plug 701 includes a standard USB shielded plug housing 703, which conforms to the standard USB architecture described in the Universal Serial Bus specification referenced above. Standard USB shielded plug housing 703 operates to communicate differentially driven data signals D+ and D−, a 5-volt signal, and a ground signal.

Some or all portions of the topology shown in FIG. 1 may use a modified (enhanced) USB cable having an extra conductor to supply the extra voltage. Of course other voltages could be added so that a single cable may supply three or more voltages with the addition of other conductors or wires. For purposes of clarity of understanding, the present invention will be described with respect to two conductor types in the cable. Cables with at least one other conductor (i.e., for instance 5 wire) are referred to as auxiliary (or non-standard) cables in that they supply or are capable of supplying auxiliary power. The auxiliary cables are designed to operate seamless with non-auxiliary powered devices.

In other words, some of cables 702 and corresponding connectors 701 illustrated in FIG. 1 may implement non-standard USB, or auxiliary, configurations for providing other than standard USB voltages to hubs or peripherals.

Figure 8:
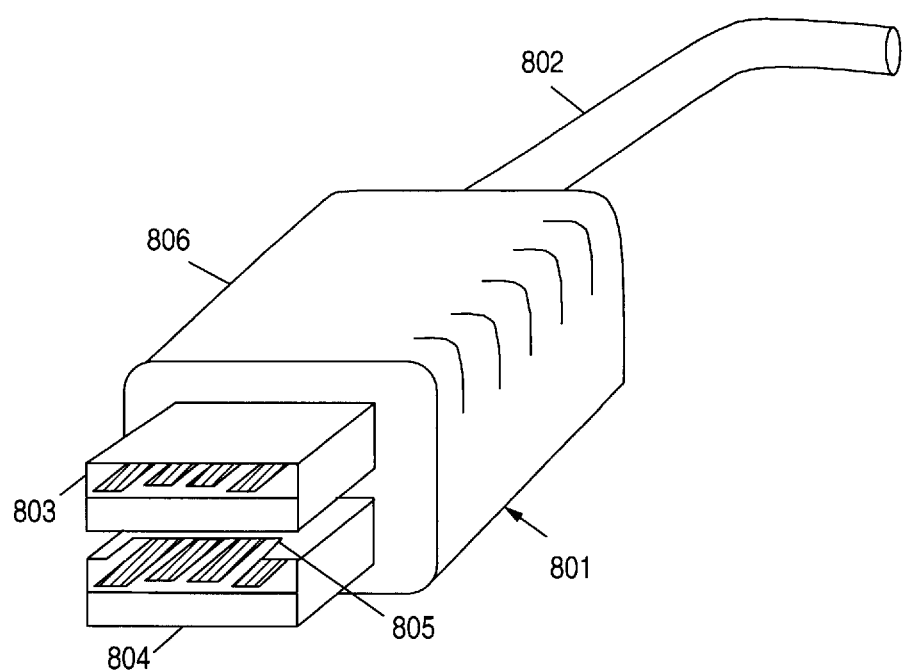
FIG. 8 illustrates a non-standard USB plug.

Referring next to FIG. 8, there is illustrated auxiliary plug 801, which further includes a non-standard USB portion 804, which may communicate non-standard USB power transmission, such as auxiliary voltage signals and corresponding ground signals. Plug 801 has overmold 806 corresponding to overmold 704, standard USB portion (plug housing) 803 corresponding to shielded standard portion (plug housing) 703, and bus 802 corresponding to bus 702, except that additional hardware and parts have been added to implement non-standard USB portion 804. Housing 804 may include a housing having cut-out portion 805, which enables housing 804 to mate with a non-standard USB receptacle through specifically designed chassis cut-outs. Please refer to cross-referenced patent application Ser. No. 08/807,493, filed Feb. 27, 1997 for a further discussion of such chassis cut-outs and non-standard plug 801.

Using the auxiliary cable, peripheral devices can be supplied power at two or more distinct voltages: the standard USB voltage of +5 and one or more other voltages. The voltage and power requirements for the auxiliary power can be negotiated with the host or hub. The auxiliary powered USB hub or function uses the standard USB communications and standard USB power to request a second voltage and power.

Auxiliary Host Device

Figure 2:
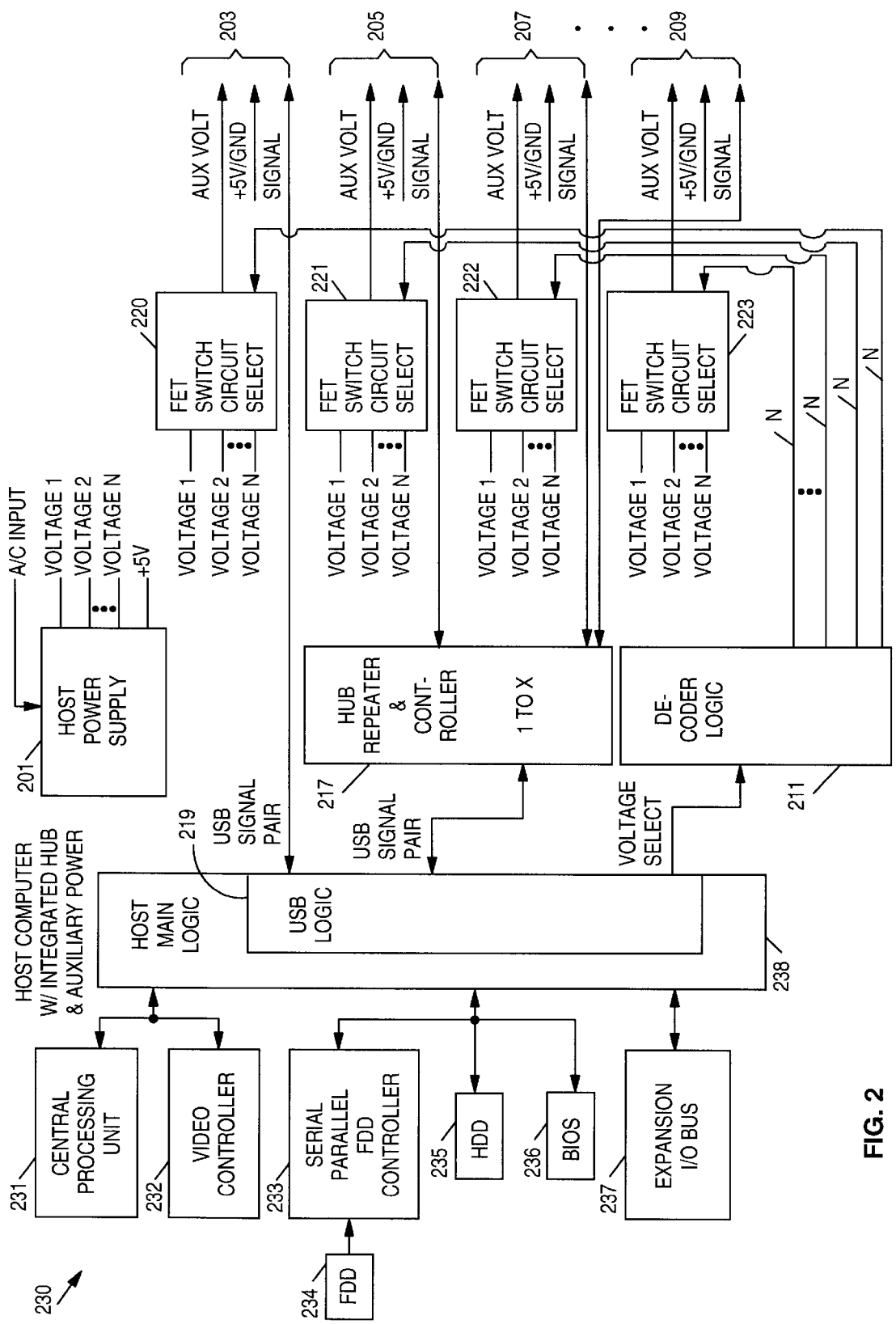
FIG. 2 illustrates a host computer with integrated hub and auxiliary power.

FIG. 2 illustrates a host device 230 with multiple auxiliary USB ports 203, 205, 207, 209. The host device 230 could be the same as host/hub 101 illustrated in FIG. 1. The host device 230 may include central processing unit 231, video controller 232, serial parallel floppy disk drive controller 233, floppy disk drive 234, hard disk drive 235, bios 236, expansion I/O bus 237, and host main logic 238. Naturally, host 230 may include other well-known data processing system elements. Note that a standard USB device can use an auxiliary USB port by using a standard USB cable.

The power supply 201 takes AC input and provides a plurality of DC voltages, including the USB standard voltage +5 volts. Other voltages may include +12, −12, +24, −24, or −3 volts. Any suitable voltages may be selected. The non-standard voltages are supplied by conductors (not shown) to switch circuits 220–223 provided for each of the ports 203, 205, 207, 209, respectively. In addition to the standard +5 volts, each port 203, 205, 207, 209 shown in FIG. 2 is capable of providing an auxiliary voltage from one of the many voltages output by the power supply 201. The host 230 can select which ports are provided with which auxiliary voltages using the decoder 211. The decoder 211 can direct each of the switches 220–223 to select the appropriate voltage for each of the ports 203, 205, 207, 209 as requested by the auxiliary peripheral device.

A 1toX hub repeater and controller 217 provides for data communications from the host 230 to the peripherals and hubs (see FIG. 1) and also provides the host 230 with data communications from the peripherals and hubs. The USB host/hub 230 is generally a Very Large Scale Integrated (VLSI) state machine which is controlled by the host CPU 231. The Auxiliary USB logic is shown in function block 219. The USB logic 219 handles standard USB functions as well as auxiliary power requests.

Auxiliary Hub

Figure 3:
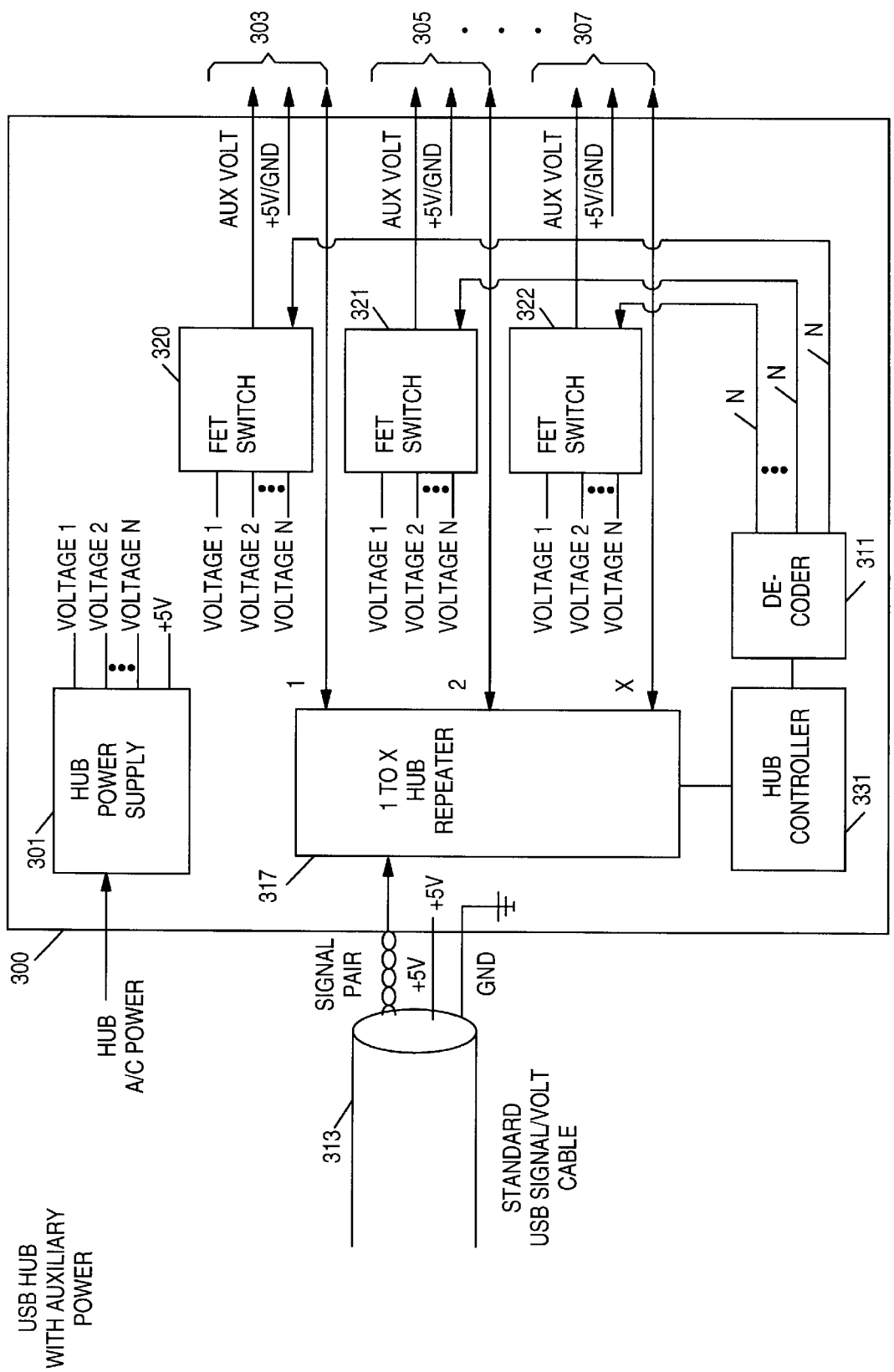
FIG. 3 illustrates a hub with auxiliary power capabilities.

FIG. 3 illustrates a functional block diagram of an auxiliary hub 300 which could be keyboard 103 or monitor 102. The auxiliary hub 300 provides for three auxiliary powered USB ports 303, 305 and 307 although more could be added. Each of the ports 303, 305, 307 provide a standard USB port with the additional auxiliary voltage. The auxiliary hub 300 is connected to the host 230 (see FIG. 1) via standard USB cable 313. Although discussed as connecting to the host/hub 230, cable 313 may connect to another hub (not shown), which may be connected to another hub (not shown) eventually reaching the host/hub 230.

The auxiliary hub 300 contains its own AC/DC power supply 301, which is capable of outputting at least one voltage other than 5 volts (i.e., at least one auxiliary voltage) and can produce a plurality of voltages including the USB standard +5 volts. The USB standard voltage may be supplied to the auxiliary ports 303, 305 and 307 from the host 230 via the host-to-hub cable 313 rather than from the power supply 301.

The non-USB standard voltages are supplied by conductors (not shown) to switch circuits 320–322. Switch circuits 320–322 are associated with each of the ports 303, 305 and 307. In addition to the standard +5 volts, each port 303, 305, 307 is capable of providing an auxiliary voltage from one of the many voltages output by the power supply 301.

The hub 300 can select which ports are provided with which auxiliary voltages, if any, using the decoder 311. The decoder 311 can direct each of the switches 320–322 to select the appropriate voltage for each of the ports 303, 305, 307, respectively, as requested by the auxiliary peripheral device.

The hub controller 331 is coupled to the decoder 311 and 1toX hub repeater 317. The repeater 317 makes sure (1) data sent from cable 313 makes its way to the addressed peripheral, and (2) data flowing upstream makes it way to the host 230.

Use of the power supply 301 in the hub 300 requires that A/C power be supplied to the hub 300. This entails use of a power cord and access to A/C outlet. Normally this would be an AC outlet on the host computer. Use of the power cord can be eliminated by using upstream auxiliary power in a DC—DC converter if a different voltage is required by the peripheral devices. The power available to downstream devices would be limited, since total power received from the upstream auxiliary power source is divided among the downstream devices.

In FIG. 3, this would be implemented by replacing standard USB cable 313 with an enhanced USB cable with auxiliary power conductors, as is disclosed herein. The auxiliary power conductors would flow to downstream ports. Note, however, that the downstream ports would then no longer be able to request any type of auxiliary voltage. An allowance would need to be made for hub 300 to request a specific auxiliary voltage from the upstream host (e.g., the highest available voltage from the host). Then, during the auxiliary power request phase of step 615 in FIG. 6A, host software could request downstream devices to resubmit their request based on available voltage. A device could then signal a new power request or that it does not have DC—DC capability and cannot be configured, or the host could determine that the request exceeds the host power supply capacity and not configure the device.

The implications to the upstream power management is that the upstream power management for the auxiliary power is dictated by the host computer power management protocol. Auxiliary power should be viewed as the device's "local power supply" for power management purposes. Please refer to section 7.2.1.2 on "Self-Powered Hubs," and section 4.3.2 on "Power Management" within the Universal Serial Bus Specification referenced above.

Peripheral Devices

Figure 4:
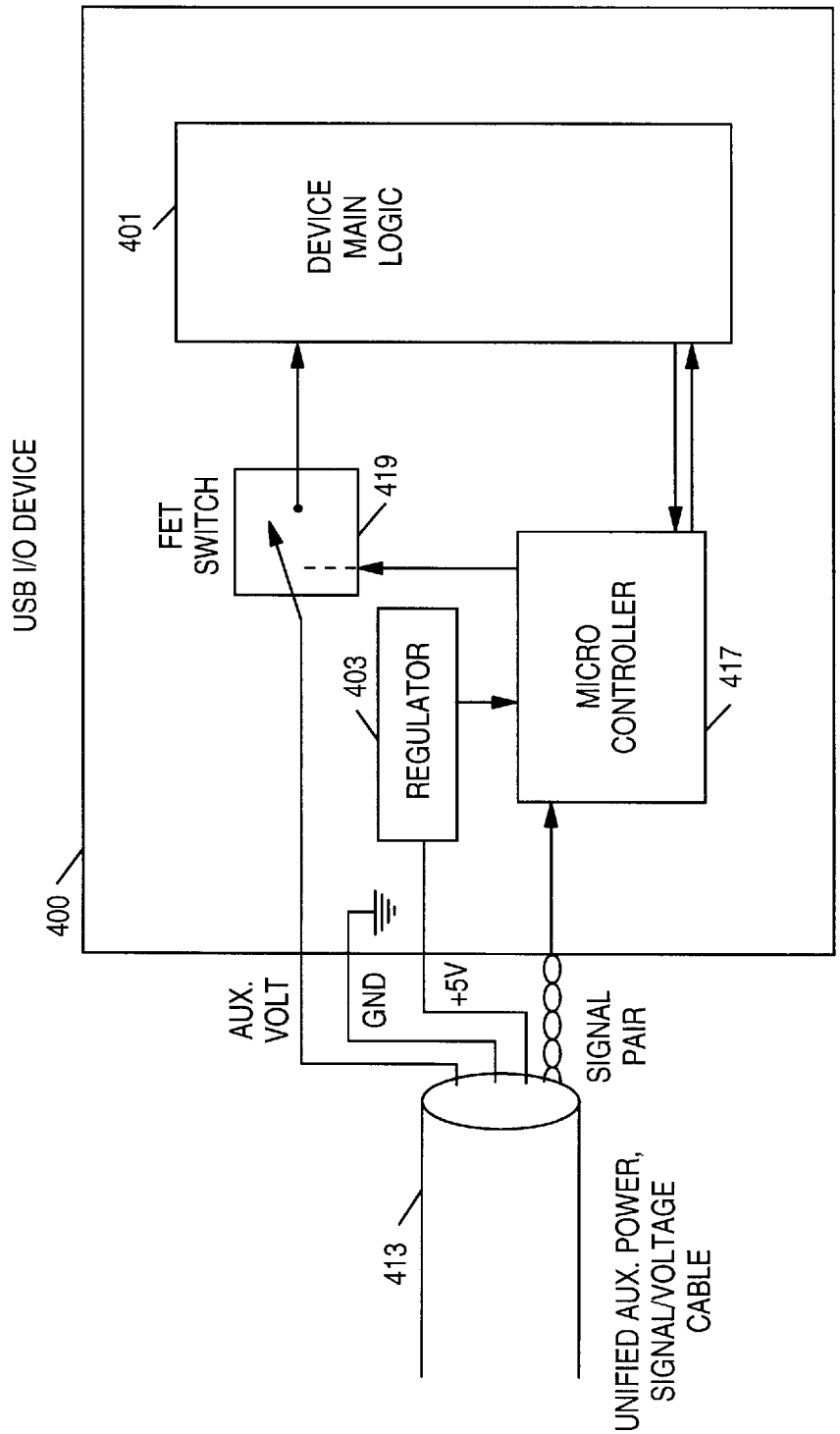
FIG. 4 illustrates a peripheral device with auxiliary power.

FIG. 4 illustrates a peripheral device 400 that can make use of auxiliary power. The auxiliary peripheral 400 is coupled to the auxiliary cable 413 as shown. The auxiliary cable 413 may be coupled to host 230, or hub 300. The auxiliary peripheral device ("APD") 400 makes use of standard USB signals to request auxiliary power. Thus, when the cable 413 is hot plugged, USB standard power signals (+5 volts) provide power to the microcontroller 417 via regulator 403. The microcontroller 417 then can request an auxiliary voltage and power allocation using standard USB communications described below. As shown in FIG. 4, the APD 400 may include a switch 419 under control of the microcontroller 417. The switch 419 can prevent damage to the APD 400 by not permitting a connection from the auxiliary voltage line to the peripheral device's main logic 401 until the microcontroller 417 has received input from the auxiliary host 230 or hub 300 that its auxiliary power request can be granted.

Auxiliary Power Communication Protocol

The auxiliary USB peripheral 400 makes use of an auxiliary power enumeration process that uses native USB power and communications. The USB communication protocol uses four types of transactions: Control, Bulk, Interrupt and Isochronous. The Control transaction is used during device enumeration to communicate device configuration information to the host. This is done in two stages: Setup and Status. The Setup stage contains three packets: Token, Data and Handshake. The Setup stage serial bit stream showing the three packets is illustrated in FIG. 5. The Data packet is formatted as shown in Table 1.

TABLE I

| FIELD DESCRIPTION | BYTES |
| --- | --- |
| Request Type | 1 |
| Request | 1 |
| Value | 2 |
| Index | 2 |
| Length | 2 |

The APD 400 can communicate its auxiliary power requirements in several ways. The first makes use of device descriptor data field as shown in Table II. The device descriptor data structure is returned to a host in response to a GET_DESCRIPTOR request type and has the following format:

TABLE II

| FIELD DESCRIPTION | BYTES |
| --- | --- |
| Length of Descriptor | 1 |
| Descriptor Type | 1 |
| USB Specification Number | 2 |

TABLE II-continued

| FIELD DESCRIPTION | BYTES |
| --- | --- |
| Device Class(vendor specific type =0xFF) | 1 |
| Device Sub-Class | 1 |
| Device Protocol | 1 |
| Max Packet Size | 1 |
| Vendor ID | 2 |
| Product ID | 2 |
| Device Release Number | 2 |
| Manufacturer ID String Index | 1 |
| Product ID String Index | 1 |
| Serial Number Index | 1 |
| Number of Configurations | 1 |

One way of transferring auxiliary power requirements from the device is to assign a vendor specific Device Class (0xFF) and designate a unique device sub-class assignment with unique encoded voltage and power requirements. Using a single byte: two bits (V2, V1) could be allocated to voltage selection with the remaining six bits (C6,C5,C4,C3,C2,C1) allocated to current requirements. For current, one of 64 different levels could be specified or a fixed increment could be allocated such as 50 ma with bits C1–C6 indicating in binary the number of increments. A fixed current increment eliminates the need for a look-up table in the ADP.

A second way for the APD 400 to specify power requirements is to use a Product String Index pointing to a string containing voltage and current requirements. This string may be text format and include a voltage request (ie., "12V") and a current request (i.e., "800 ma"). The index to a product string is contained in the Device Descriptor at offset 15 (see section 9.6.1 of the Universal Serial Bus Specification referenced above). The index points to the location of a text string in UNICODE format (see section 9.6.5 of the Universal Serial Bus Specification).

A third way of encoding the auxiliary power requirements is to use an iConfiguration Index located in the Configuration Descriptor. This may also be specified in text format. The index to a configuration is located in the Configuration Descriptor at offset 6 (see section 9.6.2 of the Universal Serial Bus Specification) and points to the location of a text string of UNICODE format (see section 9.6.5 of the Universal Serial Bus Specification).

Figure 6A:
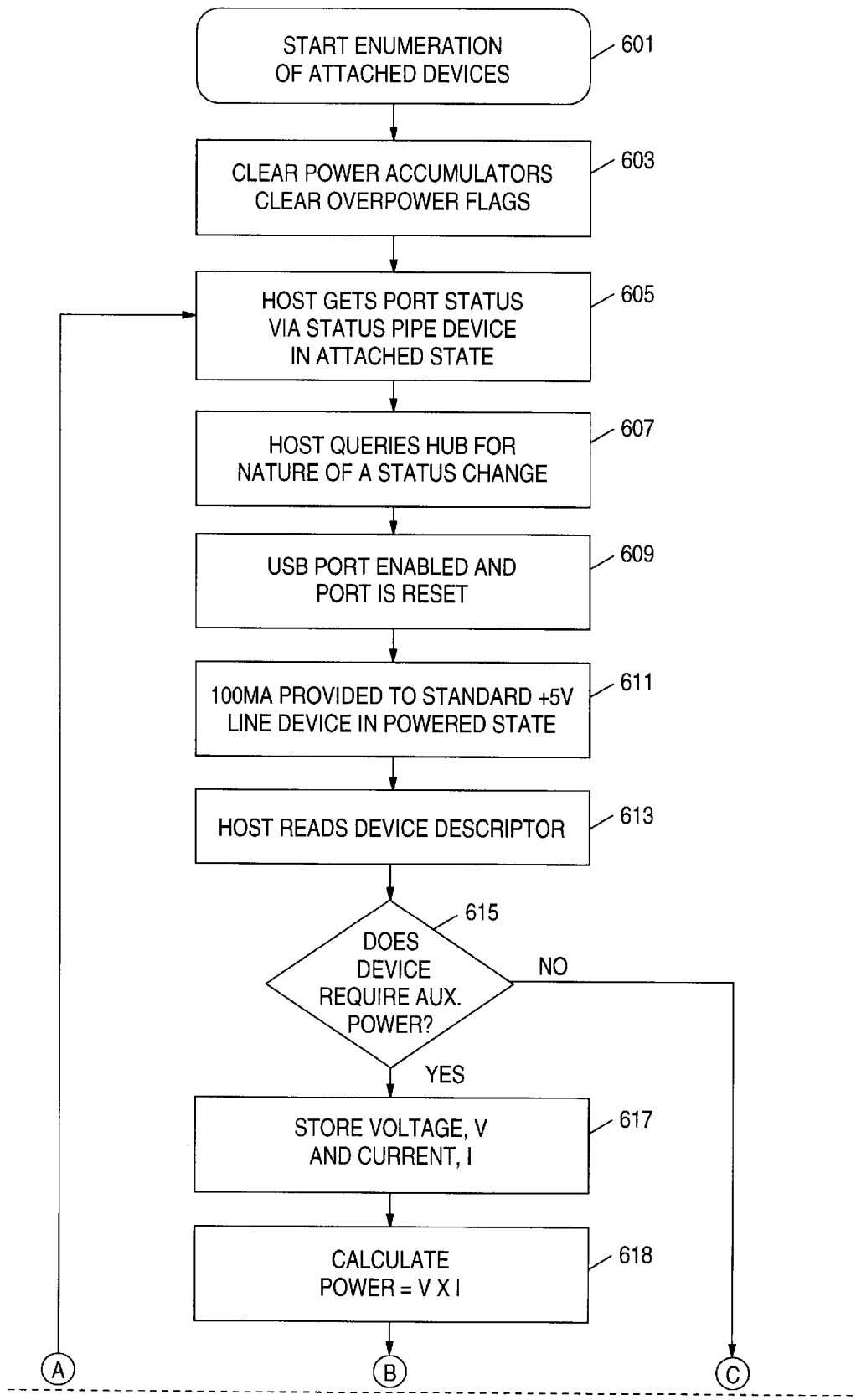
FIG. 6 illustrates with FIGS. 6A and 6B a enumeration process for determining the auxiliary power requirements of peripheral devices.
Figure 6B:
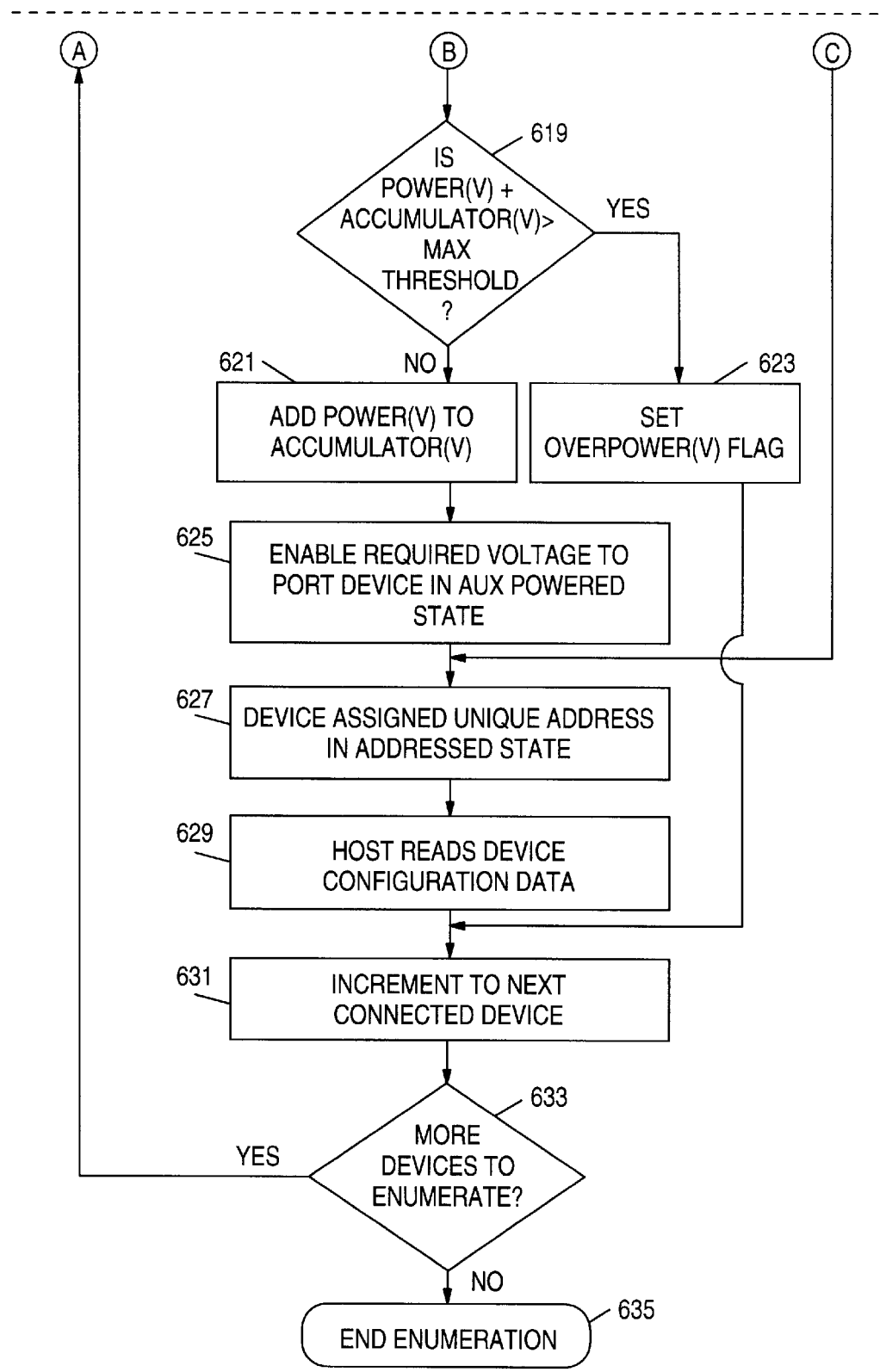

Referring next to FIG. 6, which comprises FIGS. 6A and 6B, there is illustrated a flow diagram illustrating a process, which may be implemented within USB logic 219 and/or within hub 300 for responding to request for auxiliary power from peripheral device 400. The process begins at step 601, wherein enumeration of all attached devices is begun. For example, one or more peripheral devices 400 may be coupled to ports 203, 205, 207 and/or 209, or to ports 303, 305 and/or 307.

In step 603, power accumulators are cleared and overpower flags are cleared. The power accumulator is a mathematical variable stored in a specific host memory location. Its purpose is to store a running total of supplied auxiliary power from the host A/C power supply. This variable is tested against the known maximum available power from the host power supply to prevent a host overpower condition.

The subscript "v" indicates that there could be a separate power accumulator for each different voltage line. Power supplies generally limit maximum power on each voltage line, as well as an overall maximum power.

The overpower flags are also variables and are used to store the condition that the host power supply cannot supply additional auxiliary power. There may be a separate overpower flag for each auxiliary voltage (i.e., +12v, +24v, etc.). Thereafter, in step 605, the host/hub obtains port status via status pipe. Device is now in attached state. When a hub detects that a USB cable has been plugged into one of its downstream ports, it signals to host software that a change has occurred through Port Commands. An expanded diagram of detecting a port status changed is shown in section 11.8.2 of the Universal Serial Bus Specification. This is part of the standard USB Bus Enumeration and a summary of this is shown in section 9.1.2 of the Universal Serial Bus Specification. A general description of USB device states when first plugged in is given in the first several pages of chapter 9 of the Universal Serial Bus Specification. Thereafter, in step 607, the host/hub queries the downstream hub/peripheral for the nature of a status change. Additional Port Commands are used by host software to determine what type of change occurred at the hub's downstream port, such as an Attach or Detach, etc.

Next, in step 609, the port is enabled and is reset. In step 611, standard USB power is supplied (100 milliamps provided to a standard +5 volt line) to the device through the port and USB line. Next, in step 613, the host/hub reads the Device Descriptor, which is supplied by the downstream hub/peripheral device. In step 615, a determination by above-mentioned methods is made whether or not the hub/peripheral device requires any auxiliary power. If not, the process proceeds to step 627. However, if the device does require auxiliary power, then the process proceeds to step 617 to store the voltage and current requirements of the hub/peripheral device. In step 618, the power is computed.

Thereafter, in step 619, a determination is made whether or not the power calculated in step 618 plus any power calculated in an accumulator value with respect to any other devices attached to ports is greater than the maximum threshold of the host/hub. If yes, then in step 623, an overpower flag is set and the process proceeds to step 631.

In step 621, the calculated power from step 618 is added to the accumulator value. In step 625, the voltage required by the hub/peripheral device is enabled via the auxiliary voltage line. In step 627, the hub/peripheral device is assigned a unique address. Device is now in the Address State. Devices must have a unique address with which they can be identified by the host software. Initially all devices have the same default address, but are addressed in a sequential manner during Bus Enumeration, which allows a single device to respond at any one time to host software requests. As part of Bus Enumeration, unique addresses are assigned to each device so host software can communicate with the devices in a random manner. Please refer to section 9.1.1.4 of the Universal Serial Bus Specification for further discussion on this aspect. In step 629, the host/hub reads the device configuration data. The Configuration phase of Bus Enumeration is required by host software to request specific information from the device before its function can be used (please refer to section 9.2.3 of the Universal Serial Bus Specification). Thereafter, in step 631, the logic increments to enumerate the next device.

In step 633, a determination is made whether or not there are any more hub/peripheral devices to enumerate. If yes, the process proceeds to step 605. However, if there are no more hub/peripheral devices, then the process ends the enumeration process at step 635.

This process helps ensure that an operating computer does not encounter an over-power condition and shut down during critical applications. The device is simply denied power and not configured when attached. This provides data integrity and avoids system crashes in a plug-n-play environment.

While the invention has been described in detail herein in accord with certain embodiments thereof, modifications and changes therein may be effected by those skilled in the art. Accordingly, it is intended by the appended claims to cover all such modifications and changes as fall within the true spirit and scope of the invention.

What is claimed is:

1. A host device comprising:
   circuitry operable for receiving a request, from a peripheral device coupled to said host device, for a first power-related signal, wherein said host device is a computer system including at least one processor;
   circuitry operable for sending said first power-related signal from said host device to said peripheral device in response to said request;
   a power supply operable for providing said first power-related signal; and
   a first switch operable for (1) receiving said first power-related signal from said power supply, and (2) switching said first power-related signal to be sent to a first port coupled to said peripheral device in response to decoder logic coupled to said receiving circuitry.

2. The host device as recited in claim 1, wherein said request is for a specified voltage and/or current signal.

3. A host device comprising:
   circuitry operable for receiving a request, from a peripheral device coupled to said host device, for a first power-related signal;
   circuitry operable for sending said first power-related signal from said host device to said peripheral device in response to said request,
   wherein said peripheral device is coupled to said host device via an enhanced standard universal serial bus ("USB") interface, which includes a USB voltage signal and a standard USB communications link,
   wherein said peripheral device communicates said request to said host device via said link, and
   wherein said first power-related signal is a non-standard USB power signal.

4. A peripheral device, comprising:
   circuitry adaptable for coupling to a bus having a data communications link and transmission lines operable for carrying first and second power-related signals;
   circuitry powered by said first power-related signal and operable for sending via said data communications link a request for said second power-related signal; and
   circuitry operable for receiving said second power-related signal from said bus.

5. The peripheral device as recited in claim 4, wherein said receiving circuitry further comprises a switch controllable by said sending circuitry for switching said second power-related signal to said peripheral device.

6. The peripheral device as recited in claim 5, wherein said sending circuitry is a microcontroller or a hardwired state machine coupled to said link and to said switch.

7. The peripheral device as recited in claim 4, wherein said first power-related signal and said data communications link are standard standard universal serial bus ("USB") signals, and wherein said second power-related signal is a non-standard USB signal.

8. The peripheral device as recited in claim 4, wherein said device receives all of its externally provided power from said first and second power-related signals.

9. In a data processing system, a method for providing auxiliary power from an upstream device to a downstream device, said method comprising the steps of:
   coupling said upstream device to said downstream device via a bus having a data communications link operable for transferring data communications and first and second power-related signals between said upstream device and said downstream device;
   transferring said first power-related signal from said upstream device to said downstream device, said downstream device initially powered by said first power-related signal;
   transferring, via said data communications link, from said downstream device to said upstream device a request for said second power-related signal; and
   transferring from said upstream device to said downstream device said second power-related signal in response to said request.

10. The method as recited in claim 9, wherein said bus is an enhanced standard universal serial bus ("USB"), wherein said first power-related signal is a standard USB signal, and wherein said second power-related signal is a non-standard USB signal.

11. The method as recited in claim 9, further comprising the steps of:
    coupling said upstream device to another downstream device via another bus having a data communications link operable for transferring data communications and third and fourth power-related signals between said upstream device and said another downstream device;
    transferring said third power-related signal from said upstream device to said another downstream device, said another downstream device initially powered by said third power-related signal;
    transferring, via said data communications link, from said another downstream device to said upstream device a request for said fourth power-related signal; and
    transferring from said upstream device to said another downstream device said fourth power-related signal in response to said request.

12. The method as recited in claim 9, wherein said upstream device is a host computer and said downstream device is a peripheral device.

13. The method as recited in claim 9, wherein said upstream device is a hub device and said downstream device is a peripheral device, wherein said hub device is coupling said peripheral device to a host computer.

14. The method as recited in claim 9, wherein said request specifies a voltage and a current level for said second power-related signal.

15. The method as recited in claim 14, further comprising the step of:
    switching said specified voltage and current levels from a plurality of possible voltage and current levels provided by a power supply in said upstream device to a port coupled to said bus.

16. A data processing system comprising:
    a host computer having at least one processor;
    a peripheral device coupled to said host computer via a bus having a data communications link operable for transferring data communications and first and second power-related signals between said host computer device and said peripheral device;
    circuitry for transferring said first power-related signal from said host computer device to said peripheral device, said peripheral device initially powered by said first power-related signal;
    circuitry for transferring, via said data communications link, from said peripheral device to said host computer device a request for said second power-related signal; and circuitry for transferring from said host computer device to said peripheral device said second power-related signal in response to said request.

17. The system as recited in claim 16, wherein said bus is an enhanced standard universal serial bus ("USB"), wherein said first power-related signal is a standard USB signal, and wherein said second power-related signal is a non-standard USB signal.

18. The system as recited in claim 16, wherein said request specifies a voltage and a current level for said second power-related signal, further comprising the step of:

switching said specified voltage and current levels from a plurality of possible voltage and current levels provided by a power supply in said host computer to a port coupled to said bus.

19. The system as recited in claim 16, further comprising:

circuitry for not transferring from said host computer device to said peripheral device said second power-related signal if to do so would exceed a power threshold in said host computer device.

20. The system as recited in claim 16, wherein said peripheral device is a plug-n-play device with respect to said host computer device.

21. A host device comprising:

circuitry operable for receiving a request, from a peripheral device coupled to said host device, for a first power-related signal;

circuitry operable for sending said first power-related signal from said host device to said peripheral device in response to said request;

a power supply operable for providing said first power-related signal; and a first switch operable for (1) receiving said first power-related signal from said power supply, and (2) switching said first power-related signal to be sent to a first port coupled to said peripheral device in response to decoder logic coupled to said receiving circuitry.

* * * * *